(12) United States Patent
Lesso

(10) Patent No.: US 12,267,016 B2
(45) Date of Patent: Apr. 1, 2025

(54) POWER CONVERTERS

(71) Applicant: Cirrus Logic International Semiconductor Ltd., Edinburgh (GB)

(72) Inventor: John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 242 days.

(21) Appl. No.: 17/677,097

(22) Filed: Feb. 22, 2022

(65) Prior Publication Data

US 2023/0268835 A1     Aug. 24, 2023

(51) Int. Cl.
    *H02M 3/07*        (2006.01)
    *H02M 3/158*     (2006.01)
    *H02M 1/00*        (2006.01)

(52) U.S. Cl.
    CPC ........... *H02M 3/1582* (2013.01); *H02M 3/07* (2013.01); *H02M 1/0095* (2021.05)

(58) Field of Classification Search
    CPC .............................................. H02M 3/07–078
    See application file for complete search history.

(56) References Cited

U.S. PATENT DOCUMENTS

| | | | | |
|---|---|---|---|---|
| 2016/0033988 A1* | 2/2016 | Voorwinden | ............... | G05F 5/00 323/300 |
| 2021/0083585 A1 | 3/2021 | Jiang | | |
| 2021/0336530 A1* | 10/2021 | Shen | ........................ | H02M 1/32 |
| 2022/0247306 A1* | 8/2022 | Zhang | ..................... | H02M 1/32 |

FOREIGN PATENT DOCUMENTS

| | | |
|---|---|---|
| CN | 113938013 A | 1/2022 |
| WO | 2020263288 A1 | 12/2020 |
| WO | 2021138912 A1 | 7/2021 |

OTHER PUBLICATIONS

International Search Report and Written Opinion of the International Searching Authority, International Application No. PCT/GB2023/050160, mailed Apr. 11, 2023.

(Continued)

*Primary Examiner* — Peter M Novak
(74) *Attorney, Agent, or Firm* — Jackson Walker L.L.P.

(57) ABSTRACT

A buck-boost converter for converting an input voltage at an input node into an output voltage at an output node, the converter comprising: first and second inductor nodes for connection of an inductor therebetween; a first converter stage coupled between the input node and the first inductor node; and a second converter stage coupled between the second inductor node and the output node, wherein one or more of the first converter stage and the second converter stage comprises a switching network, comprising: a first switch for selectively connecting a first flying capacitor node to a stage input node; a second switch for selectively connecting the first flying capacitor node to a stage output node; a third switch for selectively connecting a second flying capacitor node to the stage output node; and a fourth switch for selectively connecting the second flying capacitor node to a reference voltage, the first and second flying capacitor nodes for connection of a flying capacitor therebetween.

11 Claims, 8 Drawing Sheets

(56) References Cited

OTHER PUBLICATIONS

Zhang et al., "Multilevel Non-Inverting Buck-Boost Converter with Low-Frequency Ripple-Shaping Based Controller for Operating in Step-down/Step-up Transition Region", 2018 IEEE 19th Workshop on Control and Modeling for Power Electronics (COMPEL), IEEE, Jun. 25, 2018, pp. 1-7.
Li et al., "Non-Inverting Three-Level Buck-Boost Converter for Wide Voltage Range Application", 2018 IEEE Energy Conversion Congress and Exposition (ECCE), IEEE, Sep. 23, 2018, pp. 4870-4875.

* cited by examiner

| Phase | 0 < VOUT < 0.5VIN | 0.5VIN < VOUT < VIN |
|---|---|---|
| 1 | S1, S3 | S1, S3 |
| 2 | S3, S4 | S1, S2 |
| 3 | S2, S4 | S2, S4 |
| 4 | S3, S4 | S1, S2 |

POWER CONVERTERS

TECHNICAL FIELD

The present disclosure relates to multilevel buck-boost power converters.

BACKGROUND

DC to DC power converters typically use one or more switching devices to control the connection of one or more capacitors to voltage sources and to one another, to obtain voltages other than the input voltage value. Such converters may include a capacitor, known as a "flying capacitor", for transferring charge to a load. The switching device(s) are configured to control the charging and discharging of the flying capacitor in cycles to achieve the desired output voltage based on an input signal.

For some applications, it may be desirable to reduce voltage load applied to switches and inductors of such power converters to reduce power loss associated with such components and to reduce their size and complexity.

SUMMARY

According to a first aspect of the disclosure, there is provided a buck-boost converter for converting an input voltage at an input node into an output voltage at an output node, the converter comprising: first and second inductor nodes for connection of an inductor therebetween; a first converter stage coupled between the input node and the first inductor node; and a second converter stage coupled between the second inductor node and the output node, wherein one or more of the first converter stage and the second converter stage comprises a switching network, comprising: a first switch for selectively connecting a first flying capacitor node to a stage input node; a second switch for selectively connecting the first flying capacitor node to a stage output node; a third switch for selectively connecting a second flying capacitor node to the stage output node; and a fourth switch for selectively connecting the second flying capacitor node to a reference voltage, the first and second flying capacitor nodes for connection of a flying capacitor therebetween.

In some embodiments, the first converter stage may comprise the switching network. In which case, the stage input node of the first converter stage may be coupled to the input node of the converter, and the stage output node of the first converter stage may be coupled to the first inductor node.

In some embodiments, the second converter stage may comprise the switching network. In which case, the stage input node of the second converter stage may be coupled to the second inductor node, and the stage output node of the second converter stage may be coupled to the output node of the converter.

The buck-boost converter may further comprise the inductor.

The buck-boost converter may further comprise the flying capacitor.

The buck-boost converter may further comprise an output capacitor coupled between the output node and a reference voltage node.

According to another aspect of the disclosure, there is provided a buck-boost converter for converting an input voltage at an input node into an output voltage at an output node, the converter comprising: first and second inductor nodes for connection of an inductor therebetween; a first converter stage coupled between the input node and the first inductor node; and a second converter stage coupled between the first inductor node and the output node, wherein one or more of the first converter stage and the second converter stage comprises a switching network, comprising: a first switch for selectively connecting a first flying capacitor node to a stage input node; a second switch for selectively connecting the first flying capacitor node to a stage output node; a third switch for selectively connecting a second flying capacitor node to the stage output node; and a fourth switch for selectively connecting the second flying capacitor node to a reference voltage, the first and second flying capacitor nodes for connection of a flying capacitor therebetween.

In some embodiments, the first converter stage comprises the switching network. In which case, the stage input node of the first converter stage may be coupled to the input node of the converter, and the stage output node of the first converter stage may be coupled to the first inductor node.

In some embodiments, the second converter stage may comprise the switching network. In which case, the stage input node of the second converter stage may be coupled to the first inductor node, and the stage output node of the second converter stage may be coupled to the output node of the converter.

The buck-boost converter may further comprise the inductor.

The buck-boost converter may further comprise the flying capacitor.

The buck-boost converter may further comprise an output capacitor coupled between the output node and the second inductor node. The second inductor node may be coupled to ground.

According to another aspect of the disclosure, there is provided an integrated circuit comprising a buck-boost converter as described above.

An electronic device comprising a buck-boost converter as described above. The electronic device may comprises one of a mobile computing device, a laptop computer, a tablet computer, a games console, a remote-control device, a home automation controller or a domestic appliance, a toy, a robot, an audio player, a video player, or a mobile telephone, and a smartphone.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to novel multilevel buck boost converters which utilise a multilevel switching cell in several novel arrangements. Embodiments of the present disclosure aim to reduce voltage stress across both inductors and associated switches provided in the converters disclosed, whilst increasing switching frequency which may in turn lead to a reduced inductor current ripple. By reducing inductor current ripple, smaller, lower-profile inductors may be used in power converters according to embodiments of the present disclosure. By utilising an inductor having a lower inductance, the coil resistance of the inductor is also decreased leading to a reduction in power loss associated with the inductor. Additionally, since switches of the power converters described herein are configured to switch lower voltages, loss associated with their transitions is also reduced. Thus, the overall power consumption, cost and size associated with such inductors and their associated switches may also be reduced.

Figures 1, 2:
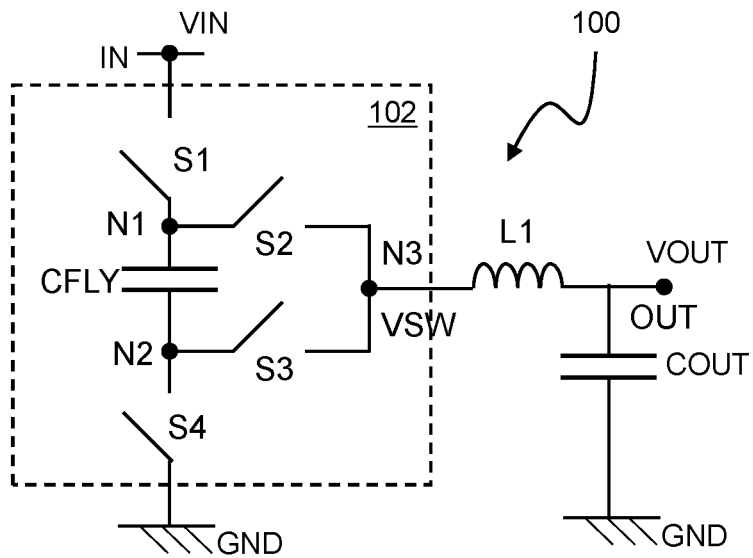
FIG. 1 is a circuit diagram of a known buck converter.
FIG. 2 is a table of switching phases for the buck converter of FIG. 1.

FIG. 1 is a circuit diagram of a known three-level buck or step-down converter 100. The power converter 100 comprises a switching cell 102 comprising first, second, third and fourth switches S1, S2, S3, S4 in addition to a flying capacitor CFLY. The converter 100 further comprises an inductor L1.

The flying capacitor CFLY is coupled between first and second flying capacitor nodes N1, N2. The first switch S1 is configured to selectively connect the first flying capacitor node N1 to an input node IN provided with an input voltage VIN. The second switch S2 is configured to selectively connect the first flying capacitor node N1 to the inductor L1 at a switch node N3. The third switch S3 is configured to selectively connect the second flying capacitor node N2 to the inductor at the switching node N3. The fourth switch S4 is configured to selectively connect the second flying capacitor node N2 to a voltage reference node, in this case ground GND. In other embodiments the voltage reference may be at a voltage other than ground. The inductor L1 is coupled between the stage output node N3 and a voltage output node VOUT. An optional output (smoothing) capacitor COUT is provided at the output voltage node VOUT.

The first, second, third and fourth switches may be implemented using transistor technology, such as MOSFET, IGBT or BJT technology.

With careful control of the switches S1, S2, S3, S4, the power converter 100 can be operated as a 3-level buck converter, operable to present a voltage at the switch node N3 of VIN, VIN/2 or ground. To do so, the switches S1, S2, S3, S4 are controlled so as to maintain the voltage across the flying capacitor CFLY at VIN/2, as will be explained in more detail with reference to FIG. 2.

To operate the converter 100 such that the output voltage VOUT is between VIN/2 and GND, the switches S1, S2, S3, S4 are controlled so as to alternate the voltage at the switch node N3 between VIN/2 and GND.

During a first phase, the first and third switches S1, S3 are closed (and the second and fourth switches open), presenting VIN-VFLY (i.e. VIN/2 assuming CFLY is charged to VIN/2) at the switch node N3. In this phase, the flying capacitor CFLY is charged whilst the inductor L1 is energised, since the output voltage VOUT is lower than the voltage VSW at the switch node N3.

During a second phase, the third and fourth switches S3, S4 are closed (the first and second switches S1, S2 open) such that the switch node N3 is coupled to ground GND. The flying capacitor CFLY is thus disconnected and the inductor de-energises to ground GND.

During a third phase, the second and fourth switches S2, S4 are closed (and first and third switches S1, S3 open) connecting the flying capacitor CFLY across the switch node N3. The voltage across the capacitor CFLY thus discharges, energising the inductor L1.

It is noted here that any charge added to the flying capacitor CFLY during the first phase should be removed during the third phase, so as to maintain the balance of charge in the capacitor CFLY such that the voltage CFLY across the capacitor is maintained at VIN/2 in steady state operation. By doing so, the duration of the first and third phases are substantially equal.

In a fourth phase, the third and fourth switches S3, S4 are again closed such that the reference voltage (e.g. GND) is provided directly to the inductor L1. This leaves the flying capacitor CFLY disconnected and de-energises the inductor L1.

As the input voltage VIN decreases, to maintain the same output voltage VOUT at the output node OUT, the duty cycle of phases 1 and 3 are increased. This has the effect of reducing the inductor current ripple until a minimum is reached when the input voltage VIN is equal to twice the output voltage VOUT.

When the input voltage VIN decreases to a point at which it is less than twice the output voltage VOUT, the converter 100 is controlled to switch the switch node N3 between VIN and VIN/2. In this mode of operation, the switches are controlled in a different sequence.

During a first phase, the first and third switches S1, S3 are closed (and the second and fourth switches open), presenting VIN-VFLY (i.e. VIN/2 assuming CFLY is charged to VIN/2) at the switch node N3. In this phase, the flying capacitor CFLY is charged whilst the inductor L1 is energised, since the output voltage VOUT is lower than the voltage VSW at the switch node N3.

During a second phase, the first and second switches S1, S2 are closed (the third and fourth switches S3, S4 open) such that the input voltage VIN is provided to the switch node N3. The flying capacitor CFLY is thus disconnected, and the inductor energises to ground VIN.

During a third phase, the second and fourth switches S2, S4 are closed (and first and third switches S1, S3 open) connecting the flying capacitor CFLY across the switch node N3. Since the voltage across the inductors L1 is greater than the voltage across the flying capacitor CFLY, the inductor L1 de-energises via the load and the flying capacitor CFLY.

During a fourth phase, the first and second switches S1, S2 are again closed such that the input voltage VIN is provided at the switch node N3. This leaves the flying capacitor CFLY disconnected and energises the inductor L1.

Thus, it can be seen that the switching cell 102 may be used to implement both multi-level boost and buck conversion depending on the arrangement of the cell 102. In addition, by switching between levels of buck or boost, the voltage drop across the various inductors L1, L2 in the examples described above is maintained at VIN/2 or less.

Several advantages arise from utilising the switching cell 102 described above. For example, voltage stress across both the inductor L1 and associated switches is reduced. In addition, the switching frequency at the switch node N3 is double that of a conventional two-switch buck or boost converter. This reduction in voltage and increase in switching frequency leads to a reduced inductor current ripple, which in turn enables the use of a smaller, lower-profile inductor L1. By providing an inductor having lower inductance, the coil resistance of the inductor is also decreased leading to a reduction in power loss associated with the inductor. Additionally, since the switches S1, S2, S3, S4 are configured to switch lower voltages, loss associated with their transitions is also reduced. Thus, the overall power consumption, cost and size associated with such inductors and their associated switches is reduced.

The inventors have found that these advantages can be compounded by implementation in various novel buck-boost architectures which incorporate one or more instances of the switching cell 102.

Figure 3:
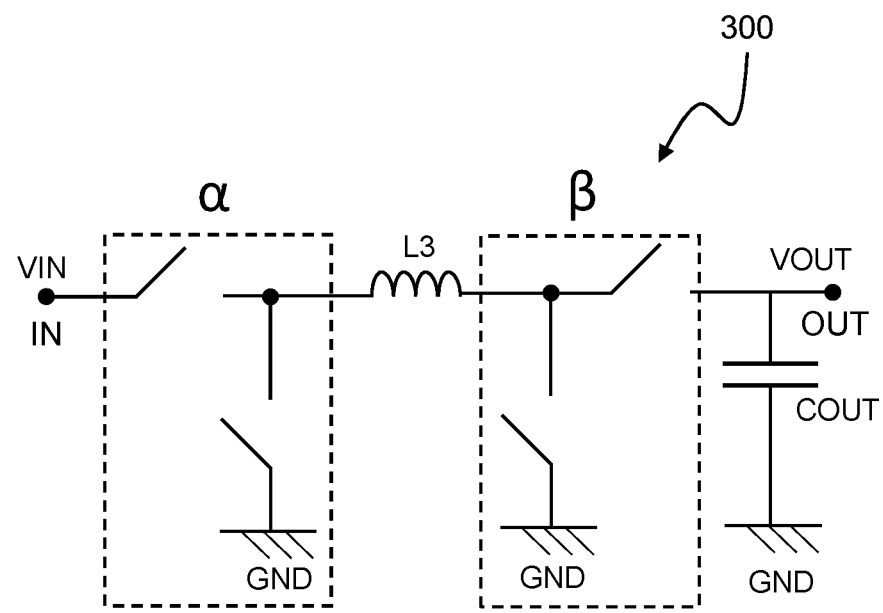
FIG. 3 is a circuit diagram of a known buck-boost converter.

To provide a comparison, FIG. 3 is a circuit diagram of a conventional non-inverting two-level buck-boost converter 300 comprising a conventional two-switch buck (alpha) stage and a conventional two-switch boost (beta) stage. An inductor L3 is coupled between the alpha and beta stages. This architecture is known in the art and will not be described in more detail here. In short, the alpha stage provides two level buck conversion, and the beta stage provides a two-level boost conversion. Accordingly, the maximum voltage drop across the inductor L3 is equal to the input voltage VIN.

The inventors have found that either or both of the alpha and beta stages shown in FIG. 3 may be replaced with the switching cell 102 described with reference to FIGS. 1 and 2, to achieve a series of novel multi-level buck-boost solutions.

Figure 4:
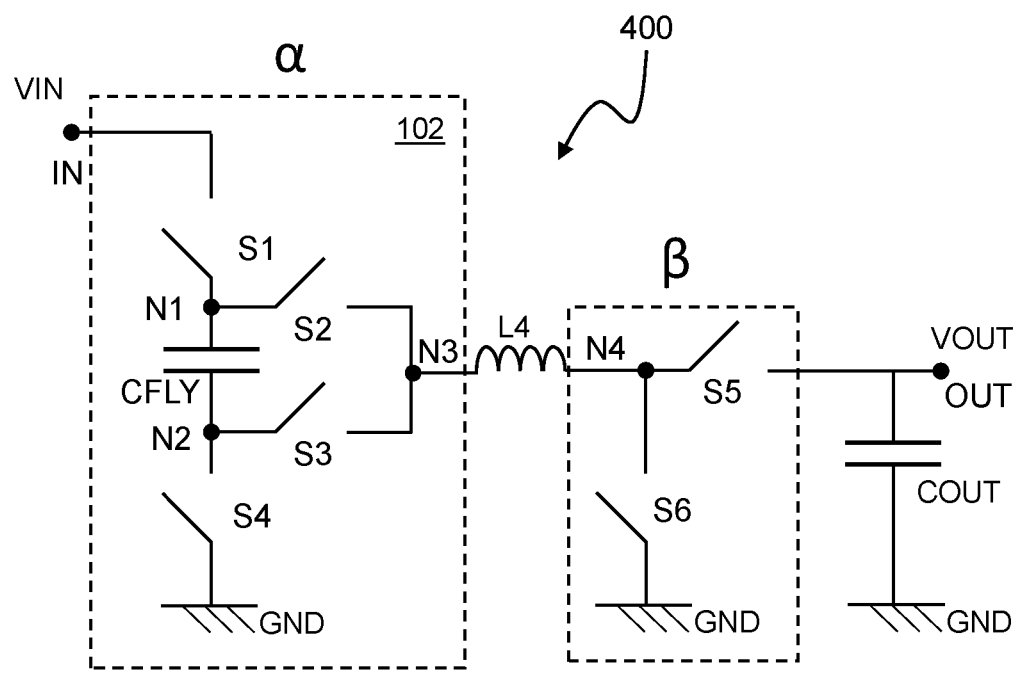
FIG. 4 is a circuit diagram of a buck-boost converter according to embodiments of the present disclosure.

FIG. 4 is a circuit diagram of a buck-boost converter 400 which is a variation of the converter 300 shown in FIG. 3 in which the conventional alpha stage has been replaced with the switching cell 102. The converter 400 comprises an alpha stage, a beta stage, and an inductor L4 coupled therebetween. The first switch S1 of the switching cell 102 is coupled to an input voltage VIN. The switch node N3 of the switching cell 102 is coupled to the inductor L4. The beta stage comprises a fifth switch S5 coupled between the inductor L4 at an inductor node N4 and a voltage output node OUT. The beta stage further comprises a sixth switch S6 coupled between the inductor node N4 and a voltage reference, in this case ground GND. An output capacitor COUT is coupled between the output node OUT and a voltage reference, in this case ground GND. In accordance with the explanation above, the alpha stage (comprising the switching cell 102) can be controlled as a three-level buck converter and the beta stage may be controlled as a 2-level boost converter. The resultant converter 400 may be configured to operate as a three-level buck (alpha) two-level boost (beta) converter.

Figure 5:
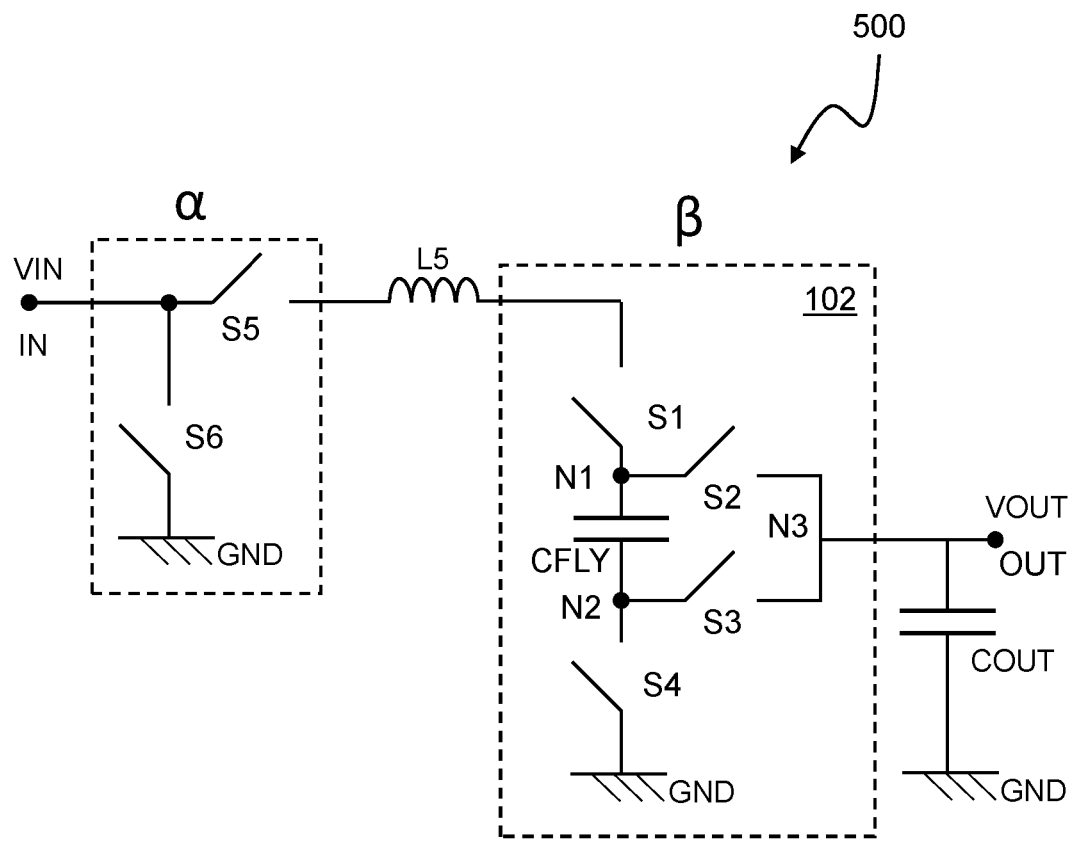
FIG. 5 is a circuit diagram of a buck-boost converter according to embodiments of the present disclosure.

FIG. 5 is a circuit diagram of a buck-boost converter 500 which is a variation of the converter 300 shown in FIG. 3. The converter 500 comprises an alpha stage, a beta stage, and an inductor L5 coupled therebetween. In the arrangement shown in FIG. 5, the alpha stage is similar to that of the converter 300. However, the beta stage of the converter 300 has been substituted by the switching cell 102 in the converter 500. The first switch S1 of the switching cell 102 is coupled to the inductor L5. The stage output node N3 of the switching cell 102 is coupled to voltage output node OUT. The alpha stage comprises a fifth switch S5 coupled between an input node IN and the inductor L5. The alpha stage further comprises a sixth switch S6 coupled between the inductor node N4 and a voltage reference, in this case ground GND. An output capacitor COUT is coupled between the output node OUT and a voltage reference, in this case ground GND.

The alpha stage may be controlled to operate as a two-level buck converter. The beta stage may be controlled to operate as a three-level boost converter. The resultant converter 500 may be configured to operate as a two-level buck (alpha) three-level boost (beta) converter.

Figure 6:
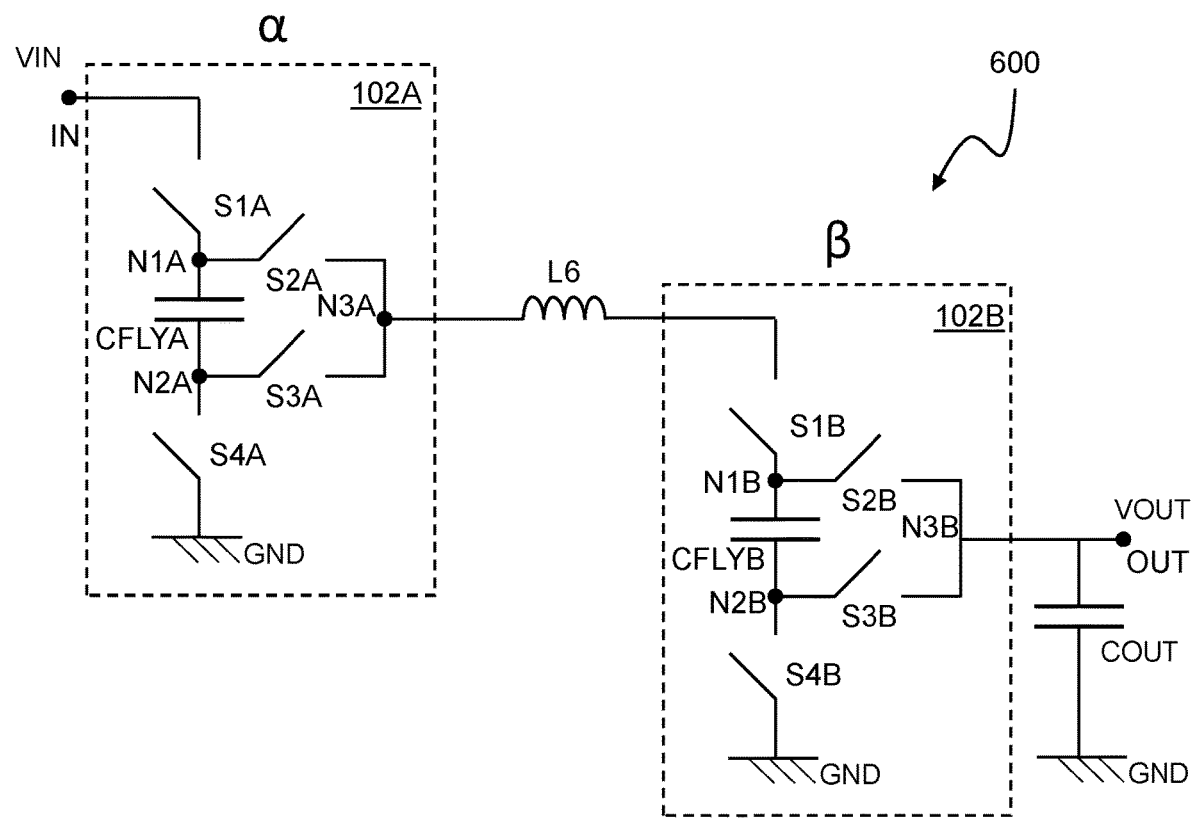
FIG. 6 is a circuit diagram of a buck-boost converter according to embodiments of the present disclosure.

FIG. 6 is a circuit diagram of a buck-boost converter 600 which is a further variation of the converter 300 shown in FIG. 3. The converter 600 comprises an alpha stage, a beta stage, and an inductor L6 coupled therebetween. In the arrangement shown in FIG. 6, each of the alpha (buck) and beta (boost) stages are implemented using a respective switching cell 102A, 102B similar to the switching cell 102 described above with reference to FIGS. 1 to 4. The first switching cell 102a comprises first, second, third and fourth switches S1A, S2A, S3A, S4A and a flying capacitor CFLYA in a similar arrangement to the switching cell 102 described above. Likewise, the second switching cell 102B comprises first, second, third and fourth switches S1B, S2B, S3B, S4B and a flying capacitor CFLYB in a similar arrangement to the switching cell 102 described above. The first switch S1A of the first switching cell 102A is coupled between a first flying capacitor node N1A of the first switching cell 102A and an input voltage node IN. The inductor L6 is coupled between a switch node N3A of the first switching cell 102A and the first switch S1B of the second switching cell 102B. A switch node N3B of the second switching cell N3B is coupled to the voltage output node OUT of the converter 600.

The alpha stage may be controlled to operate as a three-level buck converter. The beta stage may be controlled to operate as a three-level boost converter. Thus, the resultant converter 600 may be configured to operate as a three-level buck, three-level boost converter.

In FIGS. 3 to 6, various non-inverting buck-boost converters 500, 600, 700, 800 and described. The present disclosure is not, however, limited to non-inverting converters.

Figure 7:
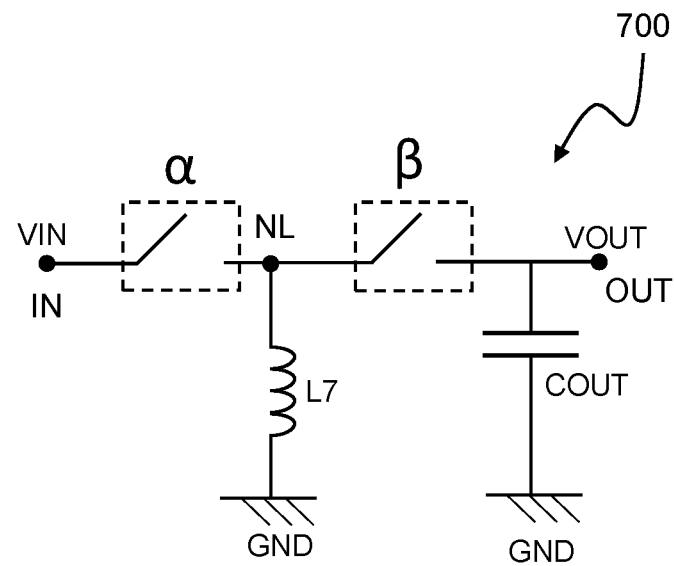
FIG. 7 is a circuit diagram of a known buck-boost converter.

FIG. 7 is a circuit diagram of a conventional inverting two-level buck-boost converter 700 comprising a conventional single switch buck (alpha) stage and a conventional single switch boost (beta) stage. The alpha and beta stages are coupled together at an inductor node NL. An inductor L7 is coupled between the inductor node NL and a reference voltage, in this case ground GND. This architecture is known in the art and will not be described in more detail here.

The inventors have found that either or both of the alpha and beta stages shown in FIG. 7 may be replaced with the switching cell 102 described with reference to FIGS. 1 to 4, to achieve a series of novel multi-level buck-boost solutions.

Figure 8:
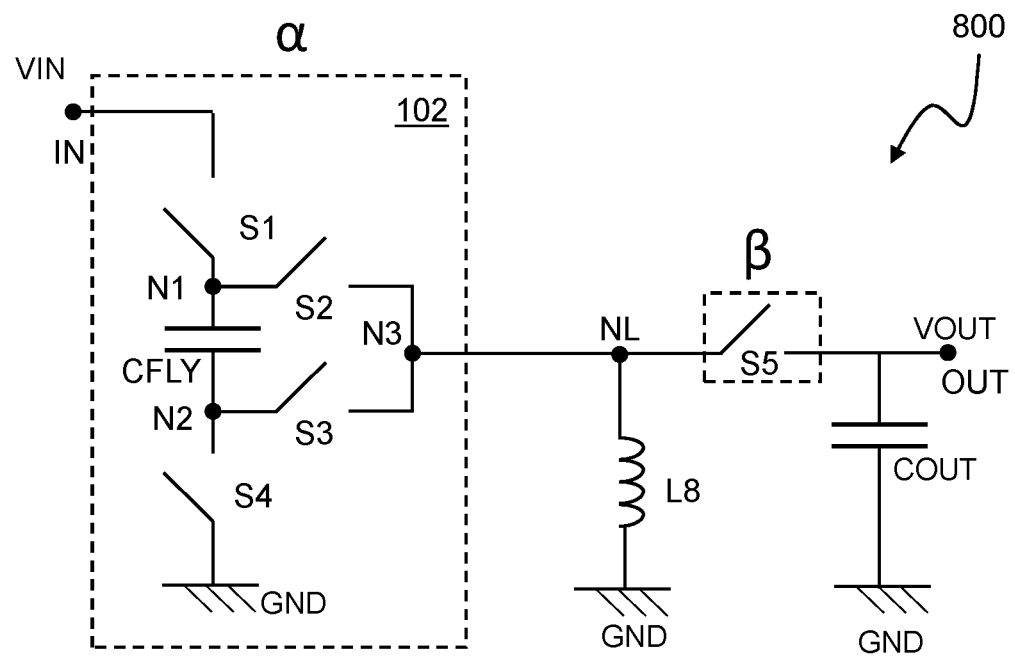
FIG. 8 is a circuit diagram of a buck-boost converter according to embodiments of the present disclosure.

FIG. 8 is a circuit diagram of a buck-boost converter 800 which is a variation of the converter 700 shown in FIG. 7 in which the conventional alpha stage has been replaced with the switching cell 102. The converter 800 comprises an alpha stage, a beta stage coupled at an inductor node NL, and an inductor L10 coupled between the inductor node NL and a reference voltage, in this case ground GND. The first switch S1 of the switching cell 102 is coupled to an input voltage VIN. The switch node N3 of the switching cell 102 is coupled to the inductor node NL. The beta stage comprises a fifth switch S5 coupled between the inductor node NL and a voltage output node OUT. An output capacitor COUT is coupled between the output node OUT and a voltage reference, in this case ground GND. The resultant converter 800 may be configured to operate as an inverting three-level buck (alpha) two-level boost (beta) converter.

Figure 9:
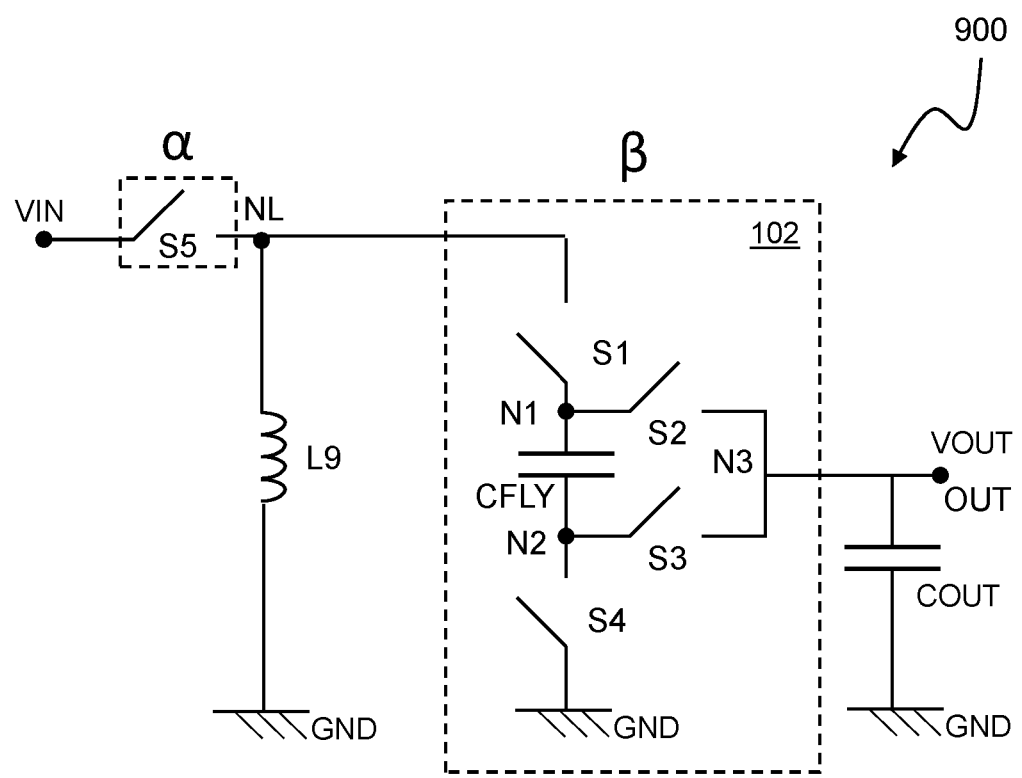
FIG. 9 is a circuit diagram of a buck-boost converter according to embodiments of the present disclosure.

FIG. 9 is a circuit diagram of a buck-boost converter 900 which is a variation of the converter 700 shown in FIG. 7. The converter 900 comprises an alpha stage and a beta stage coupled together at an inductor node NL, and an inductor L9 coupled between the inductor node NL and a reference voltage, in this case ground GND. In the arrangement shown in FIG. 9, the alpha stage is similar to that of the converter 700 and comprises a single switch S5. However, in contrast to converter 700, the beta stage has been substituted by the switching cell 102. The first switch S1 of the switching cell 102 is coupled to the inductor node NL. The stage output node N3 of the switching cell 102 is coupled to voltage output node OUT. An output capacitor COUT is coupled between the output node OUT and a voltage reference, in this case ground GND. The resultant converter 900 may be configured to operate as an inverting two-level buck (alpha) three-level boost (beta) converter.

Figure 10:
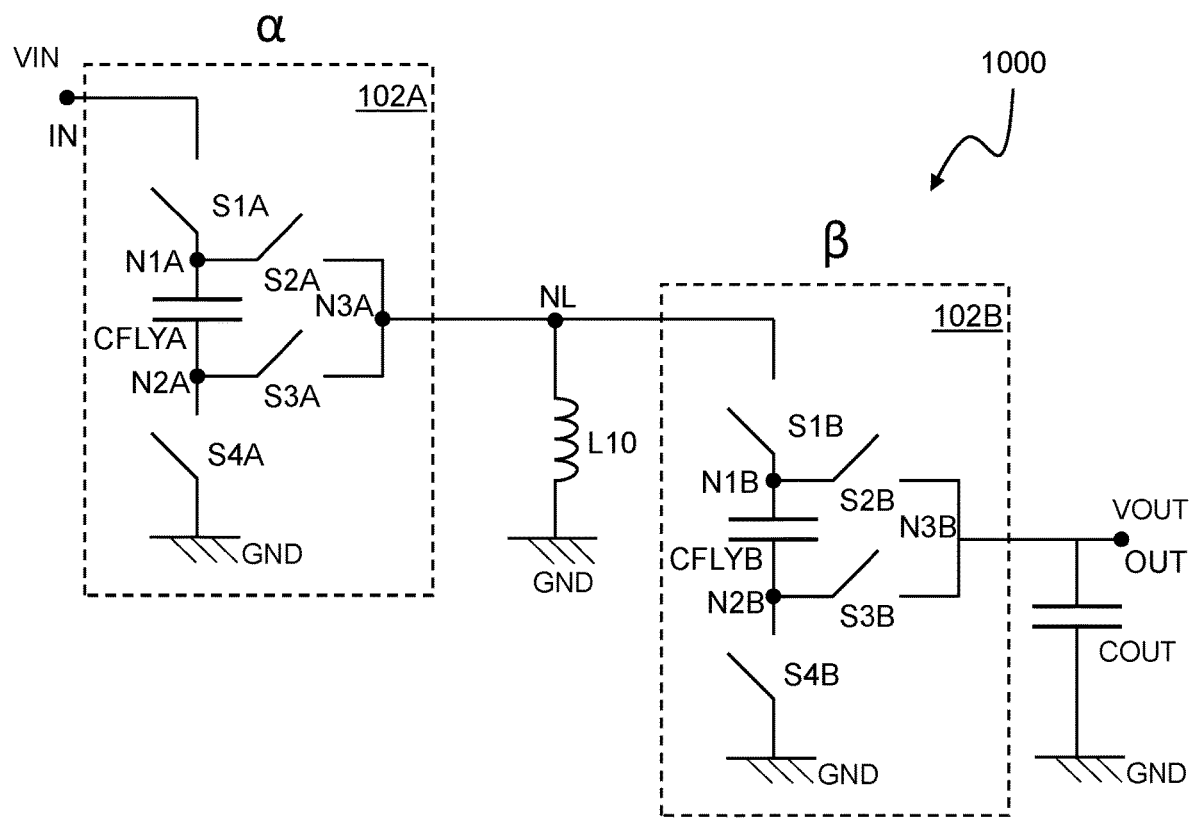
FIG. 10 is a circuit diagram of a buck-boost converter according to embodiments of the present disclosure.

FIG. 10 is a circuit diagram of an inverting buck-boost converter 1000 which is a further variation of the converter 1000 shown in FIG. 10. The converter 1000 comprises an alpha stage and a beta stage coupled together at an inductor node NL, and an inductor L10 coupled between the inductor node NL and a reference voltage, in this case ground GND. In the arrangement shown in FIG. 10, each of the alpha (buck) and beta (boost) stages are implemented using a respective switching cell 102A, 102B similar to the switching cell 102 described above with reference to FIGS. 1 and 2. The first switching cell 102a comprises first, second, third and fourth switches S1A, S2A, S3A, S4A and a flying capacitor CFLYA in a similar arrangement to the switching cell 102 described above. Likewise, the second switching cell 102B comprises first, second, third and fourth switches S1B, S2B, S3B, S4B and a flying capacitor CFLYB in a similar arrangement to the switching cell 102 described above. The first switch S1A of the first switching cell 102A is coupled between a first flying capacitor node N1A of the first switching cell 102A and an input voltage node IN. A switch node N3A of the first switching cell 102A is coupled to the first switch S1B of the second switching cell 102B at the inductor node NL. A switch node N3B of the second switching cell N3B is coupled to the voltage output node OUT of the converter 1000.

Thus, the resultant converter 1000 may be configured to operate as an inverting three-level buck, three-level boost converter.

Figure 11:
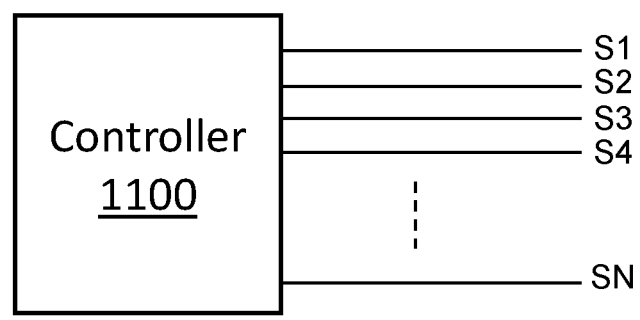
FIG. 11 is schematic diagram of a controller for controlling any one of the converters shown in FIGS. 1, and 5 to 10.

In the above explanation of the operation of the switching cell 102 and the converters 100, 400, 500, 600, 700, 800, 900, 1000 the various switches are controlled to achieve a desired output voltage VOUT based on an input voltage VIN. Such control may be implemented by a controller, such as the controller 1100 shown in FIG. 11 which may be configured to control N switches S1:SN in one or more of the regimes described above.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general-purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. An integrated circuit comprising a buck-boost converter for converting an input voltage at an input node into an output voltage at an output node, the converter comprising:
   first and second inductor nodes for connection of an inductor therebetween, the second inductor node coupled to a reference voltage node;
   a first converter stage coupled between the input node and the first inductor node;
   a second converter stage coupled between the first inductor node and the output node; and
   an output capacitor coupled between the output node and the reference voltage node,
   wherein one or more of the first converter stage and the second converter stage comprises a switching network, comprising:
   a first switch for selectively connecting a first flying capacitor node to a stage input node;
   a second switch for selectively connecting the first flying capacitor node to a stage output node;
   a third switch for selectively connecting a second flying capacitor node to the stage output node; and
   a fourth switch for selectively connecting the second flying capacitor node to a reference voltage, the first and second flying capacitor nodes for connection of a flying capacitor therebetween.

2. The integrated circuit of claim 1, further comprising a controller configured to control the first, second, third, and fourth switches of the switching network.

3. The integrated circuit of claim 1, wherein the first converter stage comprises the switching network, and wherein the second converter stage comprises a fifth switch.

4. The integrated circuit of claim 1, wherein:
   the stage input node of the first converter stage is coupled to the input node of the converter,
   the stage output node of the first converter stage is coupled to the first inductor node, and
   the fifth switch is coupled between the first inductor node and the output node.

5. The integrated circuit of claim 1, wherein the first converter stage and the second converter stage each comprises the switching network.

6. The integrated circuit of claim 1, further comprising the inductor.

7. The integrated circuit of claim 1, further comprising the flying capacitor.

8. The integrated circuit of claim 1, wherein the second converter stage comprises the switching network, and wherein the first converter stage comprises a fifth switch.

9. The integrated circuit of claim 8, wherein:
   the stage input node of the second converter stage is coupled to the first inductor node,
   the stage output node of the second converter stage is coupled to the output node of the converter, and
   the fifth switch is coupled between the input node and the first inductor node.

10. An electronic device comprising a buck-boost converter for converting an input voltage at an input node into an output voltage at an output node, the converter comprising:
    first and second inductor nodes for connection of an inductor therebetween, the second inductor node coupled to a reference voltage node;
    a first converter stage coupled between the input node and the first inductor node;
    a second converter stage coupled between the first inductor node and the output node; and
    an output capacitor coupled between the output node and the reference voltage node,
    wherein one or more of the first converter stage and the second converter stage comprises a switching network, comprising:
    a first switch for selectively connecting a first flying capacitor node to a stage input node;
    a second switch for selectively connecting the first flying capacitor node to a stage output node;
    a third switch for selectively connecting a second flying capacitor node to the stage output node; and
    a fourth switch for selectively connecting the second flying capacitor node to a reference voltage, the first and second flying capacitor nodes for connection of a flying capacitor therebetween.

11. The electronic device of claim 10, wherein the electronic device comprises one of a mobile computing device, a laptop computer, a tablet computer, a games console, a remote-control device, a home automation controller or a domestic appliance, a toy, a robot, an audio player, a video player, or a mobile telephone, and a smartphone.

* * * * *